J. W. AND H. F. CHENEY.
PROCESS OF GATHERING AND PRESERVING FRUIT JUICES.
APPLICATION FILED DEC. 19, 1917.
1,403,072.
Patented Jan. 10, 1922.
3 SHEETS—SHEET 1.
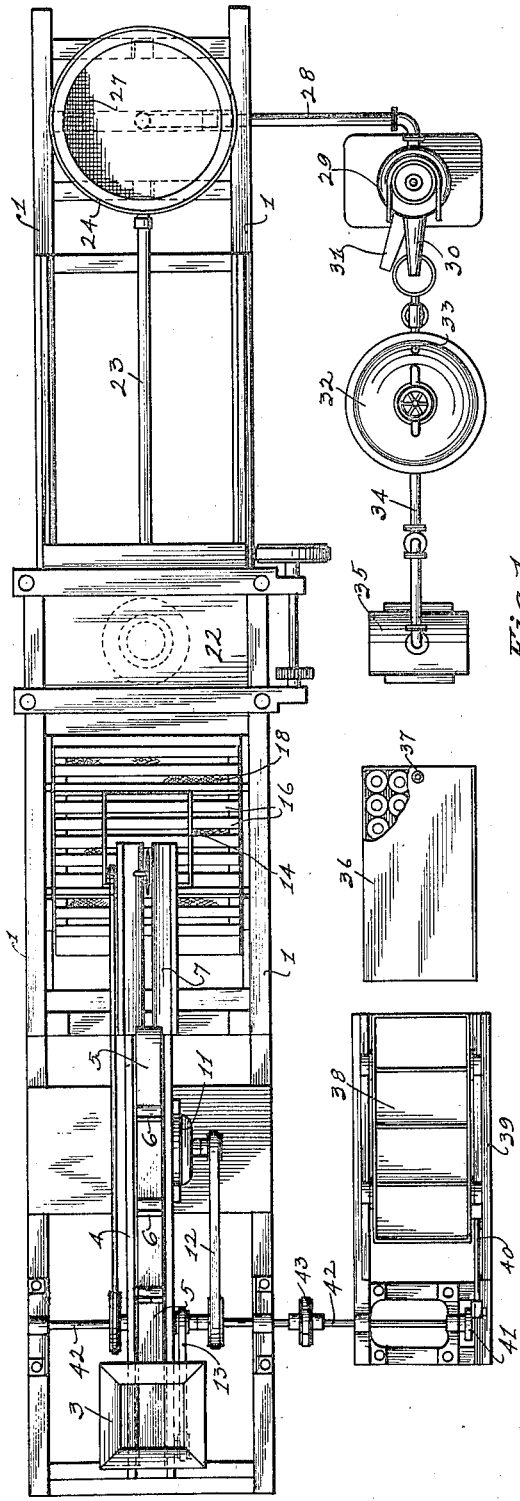
INVENTOR.
John W. Cheney
and Harry F. Cheney
BY
ATTORNEY.

J. W. AND H. F. CHENEY.
PROCESS OF GATHERING AND PRESERVING FRUIT JUICES.
APPLICATION FILED DEC. 19, 1917.
1,403,072.
Patented Jan. 10, 1922.
3 SHEETS—SHEET 3.
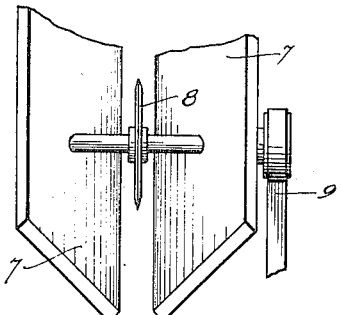
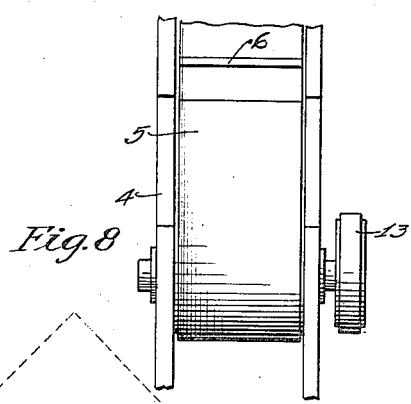
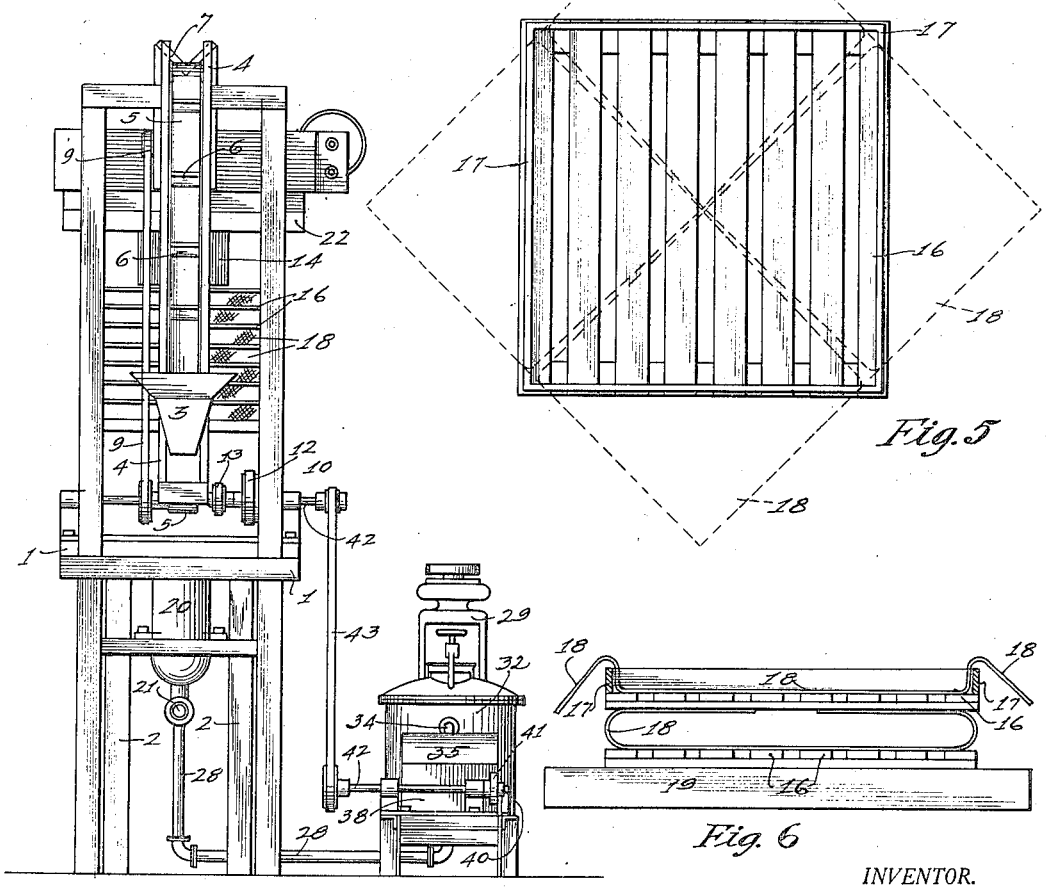

UNITED STATES PATENT OFFICE.

JOHN W. CHENEY, OF PASADENA, AND HARRY F. CHENEY, OF LOS ANGELES, CALIFORNIA.

PROCESS OF GATHERING AND PRESERVING FRUIT JUICES.

1,403,072.   Specification of Letters Patent.   Patented Jan. 10, 1922.

Application filed December 19, 1917. Serial No. 207,970.

*To all whom it may concern:*

Be it known that we, JOHN W. CHENEY and HARRY F. CHENEY, citizens of the United States, residing, respectively, in the cities of Pasadena and Los Angeles, Los Angeles County, California, have invented certain new and useful Improvements in Processes of Gathering and Preserving Fruit Juices, of which the following is a specification.

Our invention relates more particularly to an improved process for preparing and preserving pure fruit juices, especially citrus fruit juices, and has among its salient objects,—to provide a process by means of which pure fruit juices can be preserved without the use of sugar or preservatives and without destroying the natural taste of the juice, which usually results if said juice is subjected to a temperature sufficient to cause any cooking action therein; to provide a process in which the fruit, instead of being peeled, is cut and compressed, with means for separating from the juice the oils mixed therewith as a result of pressing the peel with the pulp, and which would otherwise form a scum on said juice; to provide as a part of our improved process a treatment of said juices which removes a large portion of the pulp and causes the small particles of pulp left therein, and which give color and flavor to the juice, to remain in suspension instead of settling on to the bottom of the container in which the juice is placed, and, to provide an improved combination of instrumentalities for carrying out our improved process as a continuous operation.

We have found from numerous experiments that it is better to cut the fruit in two and compress it to get the juice therefrom, than to first peel said fruit, for the reason that the peeling is a slow and expensive operation; that by subjecting said juice to a centrifugal separator, the oils and bulk of pulp can be separated therefrom and the free juice thus obtained, it being understood, of course, that said oils result from the peel or rind.

We have also found that by subjecting the free juices to a comparatively low temperature, approximately 130 degrees Fahrenheit, and then allowing time for the spores to develop and again subjecting said juice to said temperature, that all bacteria will be killed without changing the natural taste of the juice and which results when the higher heat is used; that is, instead of subjecting the juice to the usual high heat for the purpose of pasteurizing it, we have found it to be better to subject the juices to a lower heat, approximately 130 degrees Fahrenheit, a number of times, allowing time enough between each heating for the spores to develop so that the next heating will kill them, and thus destroying all bacteria therein.

We have also discovered that the very fine particles of pulp in said juices and which give the color and flavor thereto can be caused to remain in suspension in the juice instead of settling to the bottom. This we accomplish by subjecting said juice to an agitation while it is heated and then subjecting it to a cold bath. This we do after each heating, as above referred to. The agitation causes a thorough separation and uniform distribution of said particles of pulp in the juice and the cold bath during the agitation, or immediately following, causes them to remain in suspension.

We have shown on the accompanying three sheets of drawings a combination of mechanisms or instrumentalities for continuously carrying out our improved process, which we will now describe.

Figure 1 is a top plan view thereof;

Figure 2 is a horizontal sectional view, taken on line 2—2 of Figure 3;

Figure 4 is an end view thereof;

Figure 5 is a top plan view of one of the press platens, with the retaining cloth shown in dotted lines;

Figure 6 is a vertical sectional view through one layer of the cut fruit as arranged between the press platens, which are shown in section;

Figure 7 is a fragmentary top plan view showing a cutting trough; and, Figure 8 is a fragmentary view of a fruit elevator or conveyor.

Figure 3:
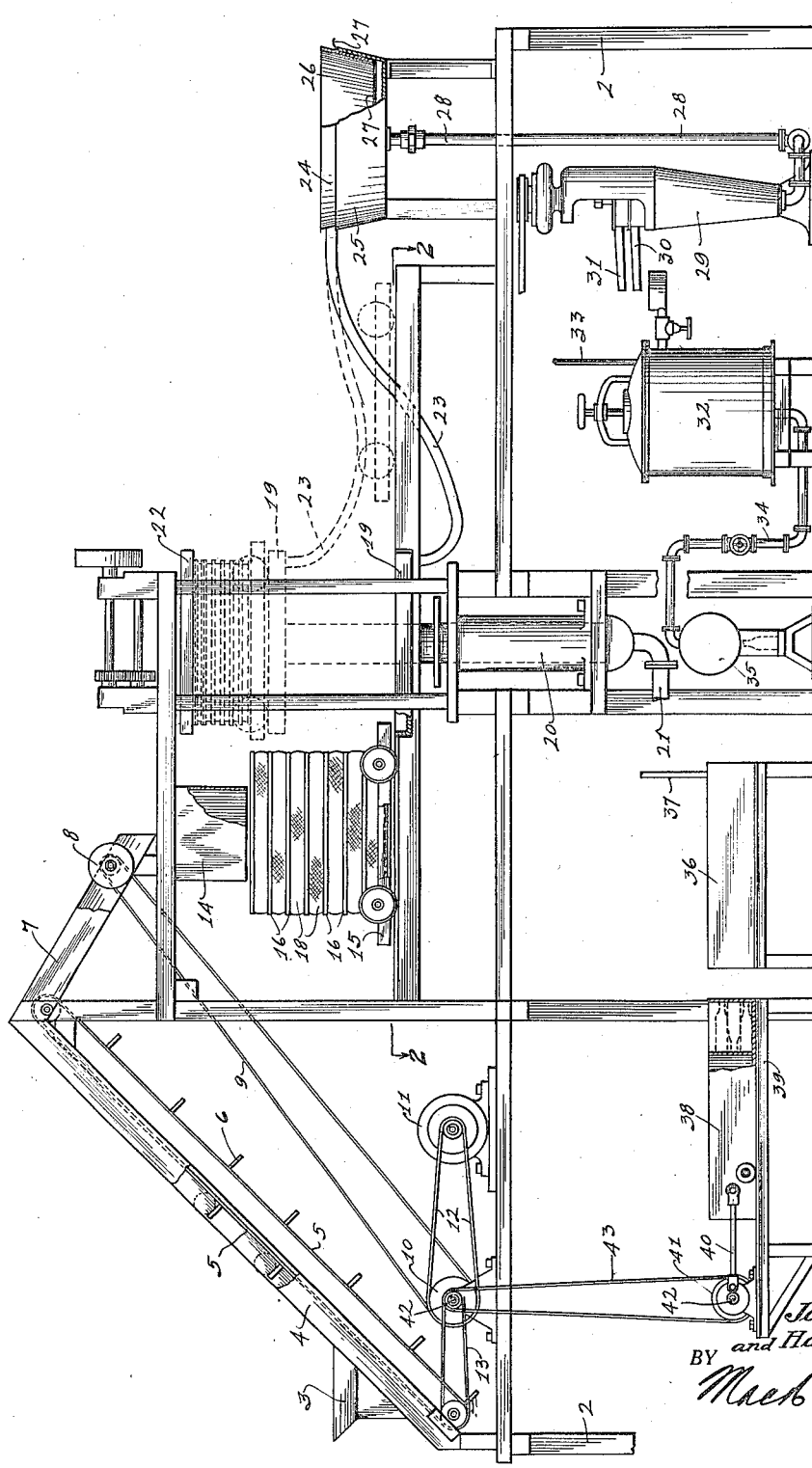
Figure 3 is a side elevation of the mechanisms.

Referring now more in detail to the drawings, we will describe one practical combination of mechanisms, or instrumentalities, suitable for carrying out our improved process. These mechanisms, or machines, in the main, are all old and in and of themselves are not patentable, nor need they be described in all their details for they are well known.

In the drawings a general upper frame structure, 1, 1, is used, supported upon leg members 2, 2, although it will be understood that part of the mechanism can be arranged on an upper floor and part on a floor below, whereby a gravity feed from one machine to the others can be had. We will describe the several mechanisms here shown for illustrative purposes in the order in which they perform their functions in our process. The fruit is discharged into a hopper 3, from which it is fed to an elevator or conveyor 4, having a traveling conveyor belt 5, provided with slats or cleats 6, which carry the fruit to the upper end of said elevator, where it is discharged into the upper end of a V-shaped trough 7, in the lower end of which is arranged a cutter disc 8, driven by means of a belt 9, extended from a driven pulley 10, driven from a motor 11, by means of a belt 12. A belt 13 drives said elevator or conveyor belt 5, as will be readily understood from the drawings. The fruit is caused to roll down said V-shaped trough 7, in single column and is cut in two by the revolving cutter disc 8. By cutting the fruit we avoid the slow and expensive operation of peeling it, and while certain oils are squeezed from the peelings, this is separated from the juices, as will be hereinafter again referred to.

From the end of the trough 7, said fruit drops through a guide frame 14, and is arranged upon a press car 15, in layers. Between each layer of fruit, as it is built up, is placed a platen or grate plate 16. Upon this is set an open frame 17, over and within which is placed a strainer cloth, 18. After a layer of the cut fruit has been placed in said frame, 17, upon said strainer cloth, the corners of the cloth are folded over on top of the fruit, as indicated in Fig. 6. The open frame is then removed and another plate, 16, is placed on top of the layer of fruit. The open frame, 17, is then placed on top of this plate or platen, and another strainer cloth placed thereover and therein, and another layer of fruit arranged therein. Thus the layers of fruit are built up on the car 15. The folded cloths are sufficient to hold the fruit around the edges, between the plates 16, 16. Said car 15 is then run forwardly onto the press platform, 19, mounted to be operated by the plunger of a hydraulic cylinder 20, having a pipe, as at 21, for supplying an operating medium thereto, whereby to force the press member 19, together with the car, and the layers of cut fruit upwardly against the upper fixed member 22, of said hydraulic press mechanism.

The juices from the fruit thus compressed, flow downwardly into the press member, 19, with which is connected a flexible pipe, 23, for conveying said juice to a strainer, 24. Said strainer is made up by using a pan or receptacle, 25, having inclined sides, a conical member, 26, fitting thereinto, and securing therebetween a strainer cloth 27, whereby the seed and solid particles are strained from said juice as it passes through said strainer into the pipe, 28, leading therefrom to a separator 29, which may be of any desired type, and provided with two discharge spouts, 30 and 31, through one of which the juice is discharged, and through the other of which the oil separated from said juice is discharged. The juice from the separator spout 30 is discharged into a tank, 32, preferably a closed tank, with which may be connected, by a pipe, 33, a source of air under pressure, for the purpose of forcing said juice through a pipe 34, to a bottling machine, 35, by means of which said juice is bottled, and which may be of any desired type. From the bottling machine, 35, said bottles are placed in a tank, 36, with which is connected a hot water pipe, 37, and in which tank said bottles are subjected to a heat of approximately 130 degrees Fahrenheit, for the purpose of killing parent bacteria therein. From said tank, 36, said bottles are laid on their sides in an agitating box, 38, mounted to be oscillated upon a supporting table, 39, by means of a pitman 40, driven from a crank wheel, 41, on a shaft, 42, also driven from the motor 11, by means of a belt, 43. During the agitation of said bottles of juice in the compartments of the agitating box, 38, or immediately following said agitation, cold water is put into said agitating box and said bottles of juice are subjected to a cold bath.

By agitating the juice while it is heated, the small particles of pulp, which give it color and flavor, and which tend to coagulate or congeal under the heat, are thoroughly shaken up and uniformly distributed again in the juice, and while in this distributed condition said juice is subjected to the cold bath which causes said fine particles of pulp to remain in suspension. If this treatment is repeated two or three times, as after each heating to destroy the parent bacteria, the juice is not only put in condition to keep, but is uniform and beautiful in color and the natural taste has not been changed by over heating. We believe this treatment to be new. We also believe we are the first to subject fruit juices, especially citrus fruit juices, to repeated heatings only sufficient to destroy parent bacteria, allowing then sufficient time for the spores to develop and again subjecting the juice to such heat. By using repeated low heats, parent bacteria are destroyed and the juice is not subjected to any cooking action which changes its taste and makes it less desirable.

While we have illustrated one combination of instrumentalities for carrying out our process, we are aware that other arrangements can be made, where there are upper and lower floors, without using all of the machines or instrumentalities which we have shown, without departing from the spirit of our invention, and we do not limit ourselves, except as we may be limited by the hereto appended claims.

We claim:

1. The process of preserving pure fruit juices without the use of an antiseptic or preservative, which consists in first removing the bulk of the pulp from the fresh juice, and leaving only sufficient pulp to give color and flavor, then subjecting the juice while sealed to three separate heatings to approximately 130 degrees Fahrenheit, whereby to kill bacteria without perceptibly affecting the taste of the juice, cooling and allowing to stand sufficiently long after each heating for the spores to develop before the next heating.

2. The process of preserving fresh fruit juices without the addition of any antiseptic or preservative which consists in first passing the juice through a centrifugal separator and separating the bulk of the pulp therefrom, then subjecting said juice, while sealed, to three separate heatings to approximately 130 degrees Fahrenheit, whereby to kill bacteria without perceptibly affecting the taste of the juice, agitating and cooling and allowing the same to stand sufficiently long after each heating for the spores to develop before the next heating.

3. The process of gathering and preserving fruit juices without the use of any added ingredient which consists in cutting and squeezing the fruit, then passing it through a centrifugal separator and separating the bulk of the pulp, and the oils from the rind, therefrom, then subjecting the juice while sealed to three separate heatings to approximately 130 degrees Fahrenheit, whereby to kill bacteria without perceptibly affecting the taste of the juice, agitating and cooling and allowing the same to stand sufficiently long after each heating for the spores to develop, substantially as described.

Signed at Los Angeles, Los Angeles County, California, this 10th day of December, 1917.

JOHN W. CHENEY.
HARRY F. CHENEY.

Witnesses as to signature of John W. Cheney:
   MARY W. BROWN,
   G. M. MIDGLEY.

Witnesses as to signature of Harry F. Cheney:
   KATHARINE A. POOL,
   L. D. CALKINS.